(12) United States Patent
Kuznetsov et al.

(10) Patent No.: US 9,917,790 B2
(45) Date of Patent: Mar. 13, 2018

(54) STORAGE DEVICE ACCESS MEDIATION

(71) Applicant: Microsoft Technology Licensing, LLC, Redmond, WA (US)

(72) Inventors: Slava Kuznetsov, Sammamish, WA (US); Vinod R. Shankar, Woodinville, WA (US); Andrea D'Amato, Kirkland, WA (US); Vladimir Petter, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 721 days.

(21) Appl. No.: 14/448,781

(22) Filed: Jul. 31, 2014

(65) Prior Publication Data

US 2016/0036720 A1 Feb. 4, 2016

(51) Int. Cl.
  *H04L 12/911* (2013.01)
  *G06F 3/06* (2006.01)
  *H04L 12/26* (2006.01)
  *H04L 12/923* (2013.01)

(52) U.S. Cl.
  CPC ............ *H04L 47/783* (2013.01); *G06F 3/061* (2013.01); *G06F 3/067* (2013.01); *G06F 3/0659* (2013.01); *H04L 43/16* (2013.01); *H04L 47/762* (2013.01)

(58) Field of Classification Search
  CPC ..... H04L 47/783; G06F 3/0659; G06F 3/061; G06F 3/067
  USPC ......................................................... 711/168
  See application file for complete search history.

(56) References Cited

U.S. PATENT DOCUMENTS

| 7,225,293 | B2 | 5/2007 | Lamberts |
| 7,721,022 | B2 | 5/2010 | Brewer et al. |
| 8,165,146 | B1 | 4/2012 | Melick et al. |
| 8,473,566 | B1 | 6/2013 | Cardente et al. |
| 8,589,655 | B2 | 11/2013 | Colgrove et al. |
| 2007/0064337 | A1* | 3/2007 | Aoki .................. G11B 7/08505 360/78.04 |
| 2008/0244209 | A1* | 10/2008 | Seelam ................... G06F 3/061 711/168 |
| 2013/0081014 | A1 | 3/2013 | Kadatch et al. |

OTHER PUBLICATIONS

Kim, et al., "A Pruning-Based Disk Scheduling Algorithm for Heterogeneous I/O Workloads", In Scientific World Journal, vol. 2014, Mar. 23, 2014, 18 pages.
"International Search Report and Written Opinion Issued in PCT Application No. PCT/US2015/042014", dated Sep. 28, 2015, 15 pages.

* cited by examiner

*Primary Examiner* — Tim T Vo
*Assistant Examiner* — Herve Iradukunda
(74) *Attorney, Agent, or Firm* — Workman Nydegger

(57) ABSTRACT

A system is configured to use a de-randomizer and budget data structure to economize I/O operations for a shared storage device while still allowing access to the device to a number of different entities. Embodiments can identify a comparatively low cost next operation as compared to other I/O operations, including a cost for seek time, for a first entity to dispatch to the storage device when the first entity has sufficient budget to have the I/O operation performed on its behalf and to identify an I/O operation for a second entity to dispatch to the storage device when there is insufficient budget for the first entity.

20 Claims, 6 Drawing Sheets

STORAGE DEVICE ACCESS MEDIATION

BACKGROUND

Background and Relevant Art

Computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated the ability to share certain computing resources. For example, different computing entities may be able to share the same storage resource. In particular, several different computing entities may share a single physical storage device, whether that storage device is a mechanical hard disk drive (HDD) having a variety of different moving parts, or a solid-state drive (SSD) with virtually no moving parts. This often occurs in a distributed system where several different storage devices are shared by several different entities. The storage devices can be logically arranged to appear as a single storage device to an entity, in spite of being composed of a number of discrete storage devices.

Sharing storage devices can result in several issues that need to be addressed. For example, a storage device typically has a limited bandwidth, meaning that it is only able to perform some limited number of I/O operations within a given period of time. The number of I/O operations that can be performed can be further reduced when some or all of the I/O operations are particularly costly in terms of time to perform the operations.

There may be contentions for the bandwidth amongst various entities. Generally, it is desirable that a system should be able to accommodate all of the entities. However, if one or more of the entities is given higher priority than other entities, the higher priority entities may, in effect, block other entities from accessing the storage device. Further, because different entities will likely access different parts of a storage device, thrashing may occur in mechanical disk based devices if some type of round-robin or random scheme is used to allow entities to access the storage device. Such schemes would create a large number of random I/O accesses which result in higher I/O access costs, particularly in mechanical HDDs, as the drive head moves to different portions of the disk to read or write data.

Thus, it would be useful to have a system that is able to manage access to a storage device by multiple entities in a way that is able to allow all of the entities to access storage device. It may further be useful if such a system is able to reduce cost or identify low cost I/O accesses to more effectively use the storage device bandwidth.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a computing system for managing outstanding I/O operations for entities to a storage device. The system includes a de-randomizer. The de-randomizer includes a plurality of slots. Each slot includes a queued list for listing I/O operations to be dispatched to a storage device. The slots are organized based on the storage device size and offsets into the storage device such that operations grouped together adjacent to each other in a queued list in the same slot are treated as sequential I/O operations to the storage device to determine I/O cost. I/O operations from different queued lists in different slots are treated as random I/O operations to the storage device to determine operation cost. The system further includes a plurality of entity queues coupled to the de-randomizer. The entity queues are configured to queue I/O operations to the storage device. The system further includes a budget data structure coupled to the de-randomizer. The budget data structure is configured to track budgets credits for entities used to determine if entities have sufficient budget to be allowed to have I/O operations dispatched to the storage device. The system is configured to use the de-randomizer and budget data structure to, based on a most recently and/or currently dispatched I/O operation dispatched to a storage device, identify a comparatively low cost operation as compared to other I/O operations, including a cost for seek time, next I/O operation for a first entity to dispatch to the storage device when the first entity has sufficient budget to have the I/O operation performed on its behalf and to identify an I/O operation for a second entity to dispatch to the storage device when there is insufficient budget for the first entity.

One embodiment illustrated herein includes a method that may be practiced in a system having a number of entities. The method includes acts for managing outstanding I/O operations to a storage device. The method includes, based on a most recently and/or currently dispatched I/O operation dispatched to a storage device, where the I/O operation has just completed or is currently actively being performed on the storage device, identifying a comparatively low cost, as compared to other I/O operations, next I/O operation to dispatch to the storage device. The cost includes a seek time factor. The method further includes determining if there is sufficient I/O budget credit, based on a total cost of the next I/O operation for the first entity to allow the next I/O operation to be dispatched to the storage device on behalf of the first entity. The I/O budget credit for the first entity is tracked in a budget data structure defining cost budgets for a plurality of entities. If there is sufficient budget credit for the first entity to allow the next I/O operation to be dispatched, the method includes dispatching the next I/O operation to the storage device. Otherwise the method includes identifying an I/O operation for a second entity to dispatch to the storage device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
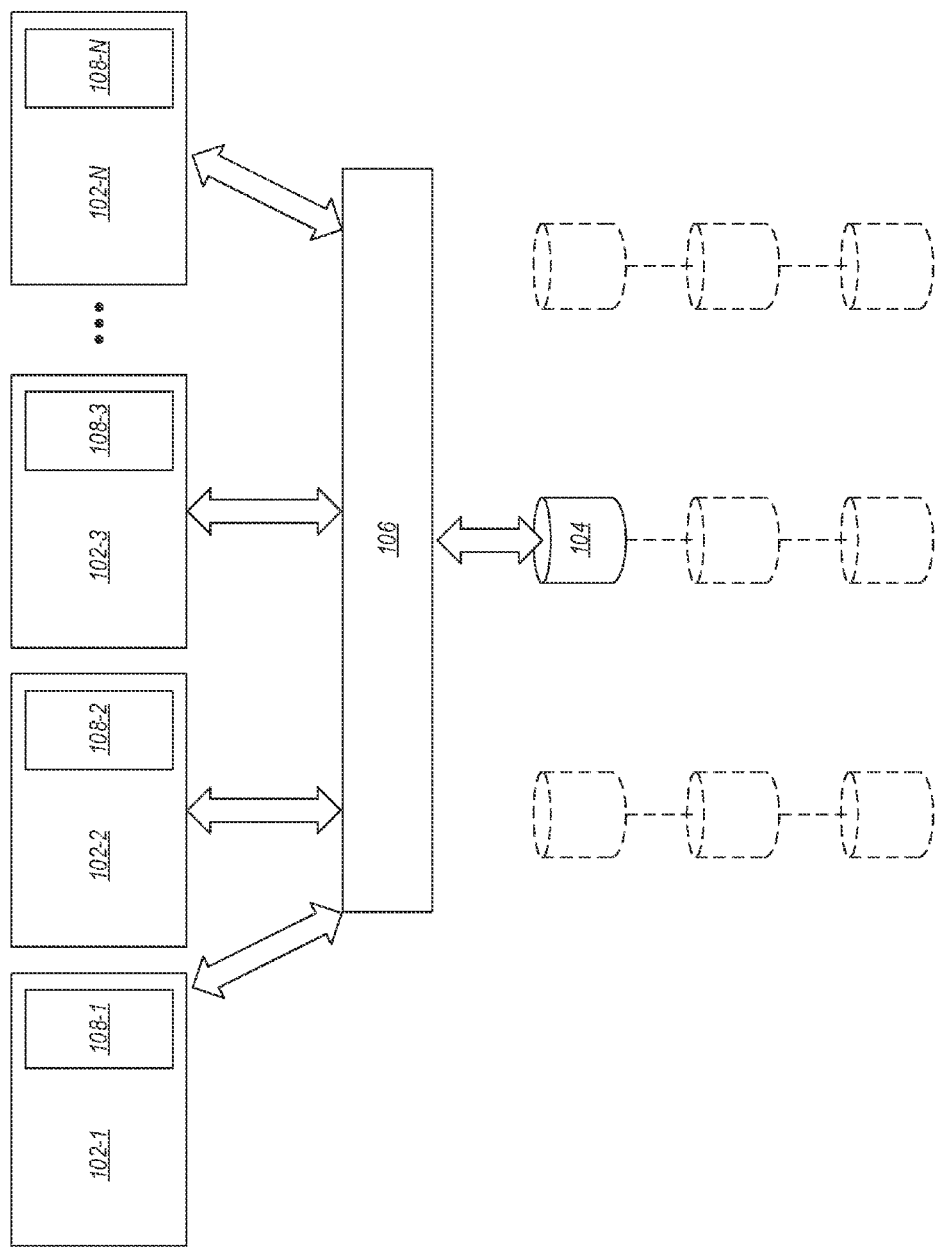
FIG. 1 illustrates a plurality of entities that share a storage device.

Referring now to FIG. 1, an example environment is illustrated. FIG. 1 illustrates a plurality of entities 102-1, 102-2, 102-3 through 103-*n*. The entities have I/O operations, such as reads and/or writes, to be performed on a storage device 104. The storage device may be, for example, a single HDD or SSD, or other appropriate storage device. Note that while a single storage device 104 is illustrated, it should be appreciated that in many embodiments, the storage device 104 will be one device from among several devices as illustrated by the various devices shown in phantom in FIG. 1. In some embodiments, each of the storage devices in the various storage devices may be hosted directly by one of the entities, but made available to the other entities. The various entities 102-1 through 102-*n* may wish to access the single storage device 104 in the broader context of accessing the various storage devices in a system.

FIG. 1 further illustrates a storage device mediation layer 106. The storage device mediation layer 106, while shown as a stand-alone layer, may in some embodiments, be implemented in a distributed fashion across the various entities. This may be particularly useful in scenarios where entities each host one or more of the storage devices. The mediation layer 106 can provide access to the various entities in the system.

When implementing a storage device access mediation system, there are several factors that may need to be considered with respect to access of a given storage device. Four such factors are identified below:

1. I/O operation prioritization: I/O operations may have different priorities. For example application I/O operations may have normal priority. Making duplicate copies of data for resiliency may be run at a high priority, especially when only a single at risk copy exists. Archiving and compressing data, or moving data to optimize storage performance may be run, in some embodiments, at a lower priority. Thus, some embodiments may support mediating I/O operation priorities for different I/O priorities. In particular, embodiments may include functionality to ensure that I/O operations for certain entities can be given higher priority but that this does not cause low priority I/O operations to be completely blocked.

2. I/O category: two categories of I/O operations illustrated herein are application I/O operations that are generated by applications accessing storage devices and internal I/O operations—generated by a framework hosting applications. Notably, embodiments may be implemented using Storage Spaces, a technology available in Microsoft Windows and Windows Server (available from Microsoft Corporation of Redmond Wash.) that enables virtualization of storage by grouping storage devices into virtual disks called Storage Spaces. In some embodiments, applications may be implemented on Storage Spaces, and the Storage Spaces may generate internal I/O operations. Application category I/O operations may block internal I/O operations and vice versa. Embodiments may therefore support mediating I/O operations with considerations given to I/O categories. While two categories are illustrated, it should be appreciated that in other embodiments, more categories may be implemented. Thus, embodiments may implement support for I/O categories to ensure I/O operations from one category (e.g. application operations) do not block I/O operations from the other category (e.g. internal system operations).

3. Entity fairness: In some systems, a single disk will be accessed by multiple entities. One entity may block other entities if it generates large number of outstanding I/O operations or sequential I/O operations. Embodiments may need to support mediating I/O operations with considerations given to ensuring that all entities have fair access to a storage device regardless of their I/O pattern. In the examples illustrated, embodiments may implement various fairness and mediation features by implementing I/O costing functionality to predict or estimate I/O costs for different I/O operations. Various entities may have I/O operation budgets. I/O operation costs may be debited against entities' operation budgets. Entities will only have their I/O operations dispatched to a storage device if they have sufficient I/O operation budgets. This allows for fair storage access across entities.

4. De-Randomization: it is well know that rotational HDDs perform much better when I/O operations are sequential. For example, a typical HDD might be able to support a bandwidth of 160 MB/s for sequential I/O operations and only 1.6 MB/s for random 8K I/O operations. Note that these figures are merely for example, and other appropriate figures may be applicable in real world implementations. As noted previously, the same disk will be used by multiple entities at the same time. For example, there may be multiple nodes, applications, internal processes, virtual machines, etc. requesting I/O operations at about the same time for a given storage device. Some embodiments herein implement functionality to de-randomize I/O operations for better efficiency when performing I/O operations. For example, embodiments may implement detection of sequential and sparse streams to reduce seek times and improve HDD throughput. In particular, embodiments may detect sequential I/O patterns and feed only one sequential stream to a disk to maximize disk performance while holding other I/Os. Alternatively, if a sequential stream cannot be identified, embodiments may detect sparse sequential I/O patterns where I/O patterns have small gaps in-between themselves so as to keep a HDD's head in the same vicinity to affect efficient performance.

Details are now illustrated.

I/O Operation Costing and Balancing

Each I/O operation has its estimated cost. The cost is approximate and, in some embodiments, is proportional to the time it is estimated for a storage device to perform an operation. The cost may be based on several different factors, such as the three factors illustrated below:

1. Seek cost—the cost required to move a HDD head to a desired position to perform I/O operations. This cost, in some embodiments, is estimated at 256 for HDDs and 0 for SSDs, for purposes of illustration herein. However, it should be noted that other embodiments may use other cost estimations.

2. Data base cost—the cost required to setup data transfer. This cost, in some embodiments, is estimated at 1 for HDDs and SSDs for purposes of illustration herein. However, it should be appreciated that this cost may be estimated differently in other embodiments.

3. Data transfer cost—in the particular example illustrated, this cost is estimated as the cost required to transfer 4K of data. In the illustrated example, this cost is 1 for HDDs and SSDs. As with the other cost estimations herein, it should be appreciated that other cost estimations may be used for other embodiments.

Note that the illustrated costs are merely examples as that in other systems and implementations, different cost values may be used. Further, additional, fewer, or alternative factors may be factored into the cost Some embodiments calculate estimated I/O cost and will try to balance between different entities (which as will be illustrated below may be defined by various priority, category and node buckets) based on the estimated I/O cost for I/O operations. In the illustrated example, the cost is the sum of seek cost, base cost and data cost (data 4K cost multiplied by number of 4K blocks). In some embodiments, the seek cost will be reduced in the following three scenarios to have more accurate costing—

1. If I/O is sequential—that is there is another I/O already dispatched where the end of the existing I/O being applied to storage equals (or is adjacent to) the start of new I/O or the start of existing I/O being applied to storage equals (or is adjacent to) the end of new I/O—the seek cost will be set to 0. Sequential operations will be adjacent to each other in the same de-randomizer slot as will be illustrated in more detail below.

2. If for a given I/O operation there are other dispatched I/O operations from the same de-randomizer slot that are not necessary adjacent to each other (as illustrated in more detail below), the seek cost, in some embodiments, will be reduced in half (or some other appropriate factor).

3. In some embodiments, if an I/O operation is sparse (sparse I/O operations are defined as I/O operations with some gap in between where the cost to read the gap is less than half of the seek cost) embodiments may substitute the gap cost as the seek cost.

Embodiments may attempt to perform a lowest or relatively lower cost I/O operation, but within the context of I/O budgets allocated on an entity basis. For example, once a first I/O operation has been dispatched for a first entity to the storage device 104, embodiments may attempt to identify another second I/O operation that would be a sequential operation with respect to the most recently and/or currently dispatched operation. This would result in a low cost for the second operation as there would be a seek time cost of 0 for the second operation. In this example, as would likely be the case, the second operation is to be performed for the first entity as well. However, this is performed in the context of a budget for the first entity, and if the first entity does not have sufficient budget, the I/O operation will not be performed at this time, but will be performed at a later time when the first entity's budget has been replenished. Instead, an I/O operation will be performed for a second entity that has sufficient budget (in fact, in some embodiments, as illustrated below, the second entity may be selected in a fashion that favors entities with higher budgets). While this will potentially result in a higher cost for the non-performed second operation (i.e. the second operation for the first entity that could not be performed because of insufficient budget for the first entity), it will also enforce fair access to the storage device 104. The de-randomizer illustrated in FIG. 4 may be used to identify sequential, sparse, or otherwise less expensive operations.

Now illustrating functionality for using and allocating budgets, embodiments may determine how I/O bandwidth is allocated based on I/O budgets for different entities. A budget for an entity defines how much I/O cost that entity is allowed to consume. As an entity has I/O operations performed, the cost of the I/O operations are debited against the budget for the entity. I/O operations will only be performed for an entity so long as it has sufficient budget for a requested I/O operation. Thus, for example, if an entity does not have sufficient budget for an I/O operation that the entity would like performed, then the I/O operation will be prevented from being performed, and a different entity with sufficient budget will have an I/O operation performed for it.

An entity can have its budget replenished so that it can have I/O operations performed on the storage device 104, but only after it has been determined that other entities have had been fairly granted opportunities to access the storage device 104. This may be determined, for example, by determining that no entities wishing to have I/O operations performed have sufficient budget to have those I/O operations performed. Thus, all entities wishing to have I/O operations performed can then have their budgets replenished to allow I/O operations to once again be performed in a fashion that provides storage device access to those entities wishing to have storage device access.

Figure 2:
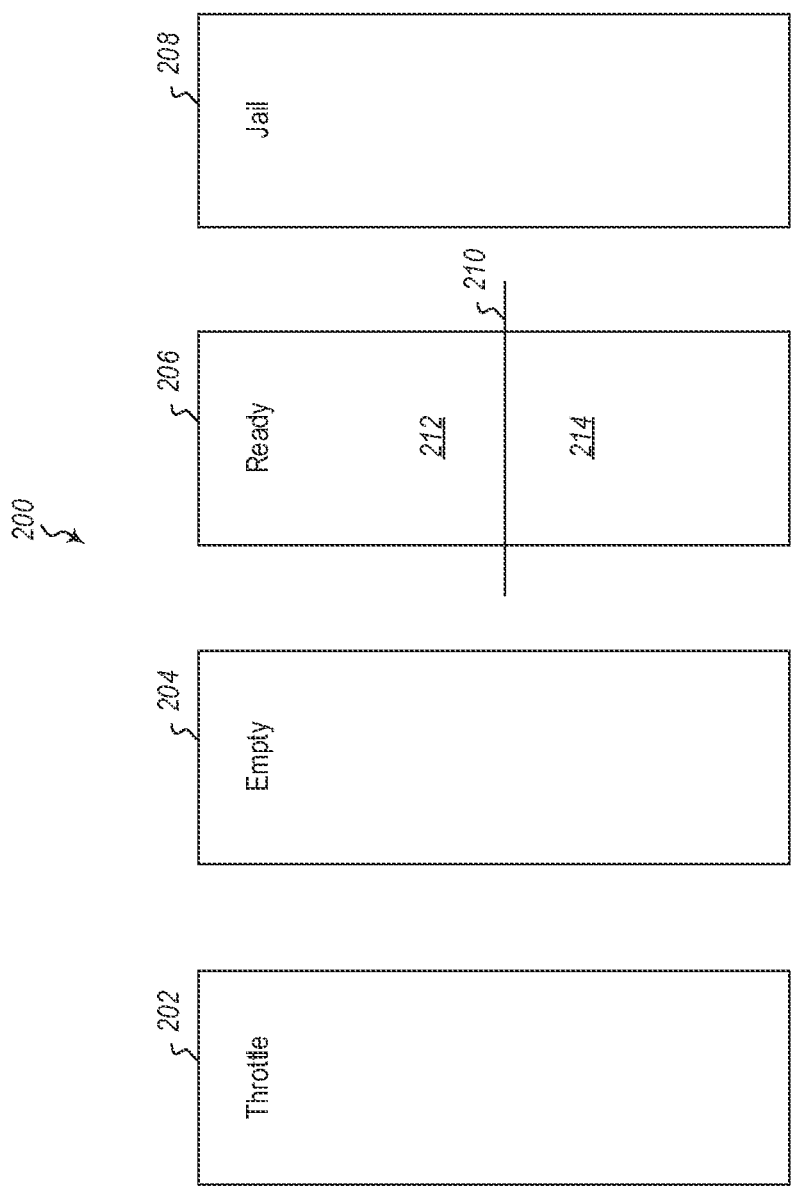
FIG. 2 illustrates various budget category data structures.

In some embodiments, this can be managed by a system that categorizes entities and manages budget for the entities based on the categorization. In one such example, entities may be categorized into one of four categories illustrated herein as: throttle, empty, ready, and jail. Entities belonging to the different categories may be identified in a budget data structure 200 having corresponding data structures 202, 204, 206 and 208, as illustrated in FIG. 2. The throttle category includes entities having no I/O operations to be performed, one or more pending I/O operations that have been dispatched to the storage device, and a threshold amount of I/O budget credit. The empty category includes entities having no I/O operations to be performed, and a threshold amount of I/O budget credit. The ready category includes entities having I/O operations to be performed and a threshold amount of I/O budget credit. The jail category includes entities not having a threshold amount of I/O budget credit.

Additionally, the throttle category contains entities that have dispatched I/O operations that have not yet completed at the storage device where the entities have already reached a maximum budget credit. When the ready category becomes empty and there are some entities in the jail category, embodiments evaluate the throttle category. If the throttle category is empty embodiments replenish credit to entities in the empty and jail categories (assuming the ready category remains empty at this point). Any entities in the empty category that reach a predetermined maximum budget credit when having their budgets replenished and have some I/O operations dispatched, but not yet completed, to the storage device are moved to the throttle category. However, if entities reach the maximum budget credit, but have no I/O operations dispatched, they are considered inactive and removed from the budgeting system. If an I/O operation completes for an entity in the throttle category, and it has no more dispatched I/O operations, it is also removed from the budget system and new credit is issued to entities in the empty and jail categories if the throttle category becomes empty.

Generally, when budgets are replenished, they are replenished according to a determination of an amount of bandwidth for the entity. Thus, for example, higher priority entities may be replenished with higher budget credit than lower priority entities. A complete budget may be determined based on device bandwidth and then divided up among the various entities according to various factors such as priority, category, node, etc.

As illustrated previously, Embodiments may be configured to perform I/O operations efficiently so as to economize I/O budgets and to efficiently use I/O bandwidth. If the same I/O operations can be performed at a lower cost, then more total I/O operations can be performed. This can be done by careful selection of the order of I/O operations, and in particular, the order with respect to a currently active or just completed I/O operation. In particular, if an I/O operation can be identified, for an HDD, that accesses storage immediately adjacent an active or just completed I/O operation, the identified operation would be a sequential operation and thus the seek time cost would be 0. However, budgets also need to be taken into account. Thus, as illustrated above, if a budget is exceeded (or in some cases, a time-out is exceeded as will be explained in more detail below), then a different I/O operation can be selected for a different entity. In some embodiments, this may be based on the amount of budget for different entities.

In particular, some embodiments may be configured to favor operations for entities with higher budgets. For example, entities in the ready category may be sorted by budget. In some embodiments this may be an absolute sort where the entities are sorted from high budget to low budget. Alternatively the sort may be a rough sort. In a rough sort example, one or more thresholds may be used. For example, some threshold 210 percentile of entities, based on budget, may be in one category 212, while lower percentile entities may be in a different category 214. Thus, for example, entities having budgets above the $50^{th}$ percentile would be in one category while entities having budgets below the $50^{th}$ percentile would be in a different category. A different percentile or category delineation may be used in alternative embodiments.

Embodiments may select I/O operations to perform based on the sorting of entities by budget. Thus, in the absolute sort case, the entity having the highest budget, or some entity with some otherwise acceptable threshold budget would have an I/O operation selected for that entity. In the case of the rough sort example, an I/O operation could be selected for any entity in the category 212 having the entities with the higher percentile budgets.

Budgets for entities may be based on characteristics of the entities. As explained previously, bandwidth may be allocated based on priority, operation category, and node. Details are now illustrated.

Priority Buckets

Figure 3:
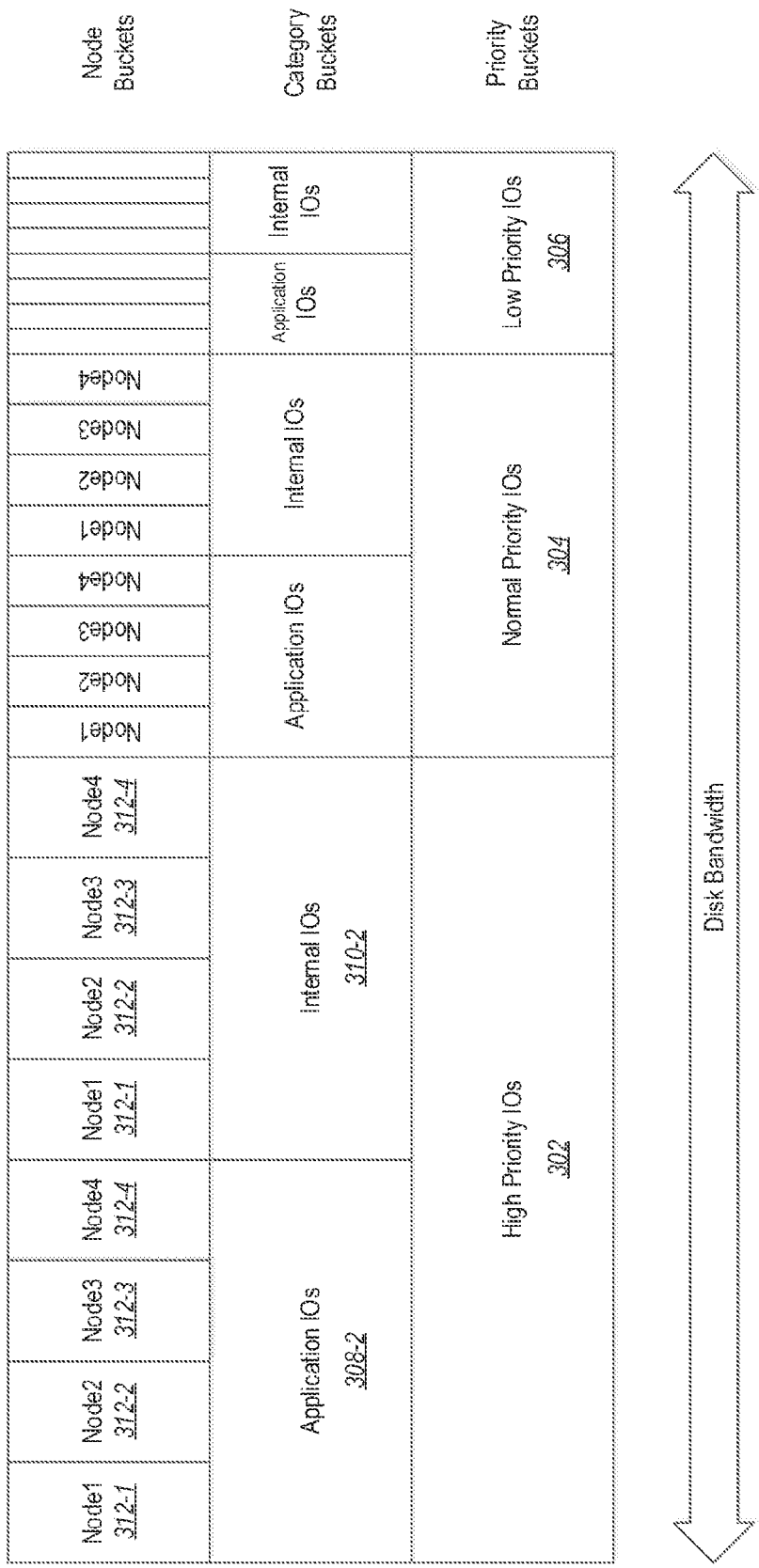
FIG. 3 illustrates various entity bucket divisions.

As noted previously, different operations may have different priorities assigned to them. In one illustrated embodiment, there may be up to 8 priorities supported—P0 . . . P7. However, this is merely by way of example, and other embodiments may support more or fewer different priorities. The priority may be set in an I/O request. The bandwidth of the storage device 104 may be divided up according to priority buckets with higher priority buckets having larger portions of the bandwidth allocated to them than lower priority buckets. For example, some embodiments may be implemented where the currently highest priority bucket (non-empty bucket that has some I/O operations) will take up to 80% of the bandwidth, the remaining 20% will be offered to the lower priority buckets. Therefore the second highest priority bucket will take up to 80% out of 20%=16% and pass remaining 4% down and so on. These numbers are only for example purposes and it should be appreciated that other percentages or allocations may be used. Further, it is not required that the allocations use the same amount of remaining bandwidth. For example, in one embodiment, the highest priority bucket may use 90% of the bandwidth, the next may use 80% of the remaining bandwidth, the next highest priority bucket may use 75% of the remaining bandwidth, and so forth. Thus, various different and/or configurable bandwidth allocations may be implemented. FIG. 3 illustrates an example where three priority buckets are implemented. In the example illustrated in FIG. 3, a high priority bucket 302, a normal priority bucket 304 and a low priority bucket 306 are illustrated.

The following now illustrates a few examples where at each priority bucket level, 80% of the remaining bandwidth is used, or the entire remaining bandwidth for the lowest level bucket. For example, if there are three active priority buckets P0 P1 P2 they will split the bandwidth in the following way—P0 (80%), P1 (16%), P2 (4%). Alternatively, if there are 2 active priority buckets P0 P1 they will split the bandwidth in the following way—P0 (80%), P1 (20%). Alternatively, if there are 2 active priority buckets P0 P2 they will split the bandwidth in the following way—P0 (80%), P2 (20%). In these examples, the highest priority bucket yields 20% to the others so the other priority buckets are not excluded and unable to make some progress. Again, while the example illustrates using 80% of remaining budget at each level (except at the lowest level where 100% of the remaining bandwidth is used), other fixed or variable allocations may be used.

Category Buckets

In the example illustrated in FIG. 3, there are two categories—application and internal. In the example illustrated, there are two corresponding category buckets per priority bucket. Thus, for example, in the high priority bucket 302, there is an application category bucket 308-2 and internal category bucket 310-2. Each category bucket, in the illustrated example, splits bandwidth in half—50%/50% if both categories are active. If one category is inactive its remaining bandwidth will be given to the other category. However, it should be appreciated this split is merely one example, and other predetermined or dynamically configuring splits may be used.

Node Buckets

Embodiments may have multiple node connections within a category bucket. Thus for example, in the example illustrated in FIG. 3, nodes 312-1, 312-2, 312-3 and 312-4 are in the application category bucket 308-2. However, the same nodes are also in the internal category bucket 310-2. A node may be a physical or logical actor configured to request I/O operations on a storage device 104 (see FIG. 1).

Using the preceding, it can be appreciated, that an entity as described herein may be embodied, in some embodiments, as a node within a certain category bucket and within a certain priority bucket. However, this configuration is merely one example, and entities can be implemented using other divisions, or with no hierarchical divisions at all. Budgets are assigned to entities. In the illustrated example, a given node may have several different budgets as being part of different entities. For example, a node may have one budget for high priority application I/O operations. The same node may have a different budget for high priority internal I/O operations. The same node may have yet a different budget for medium priority I/O operations. Etc. Budgets can be maintained per node within a category bucket in a fashion to ensure that each node has its fair share of the total bandwidth for the storage device 104.

De-Randomizer

Figure 4:
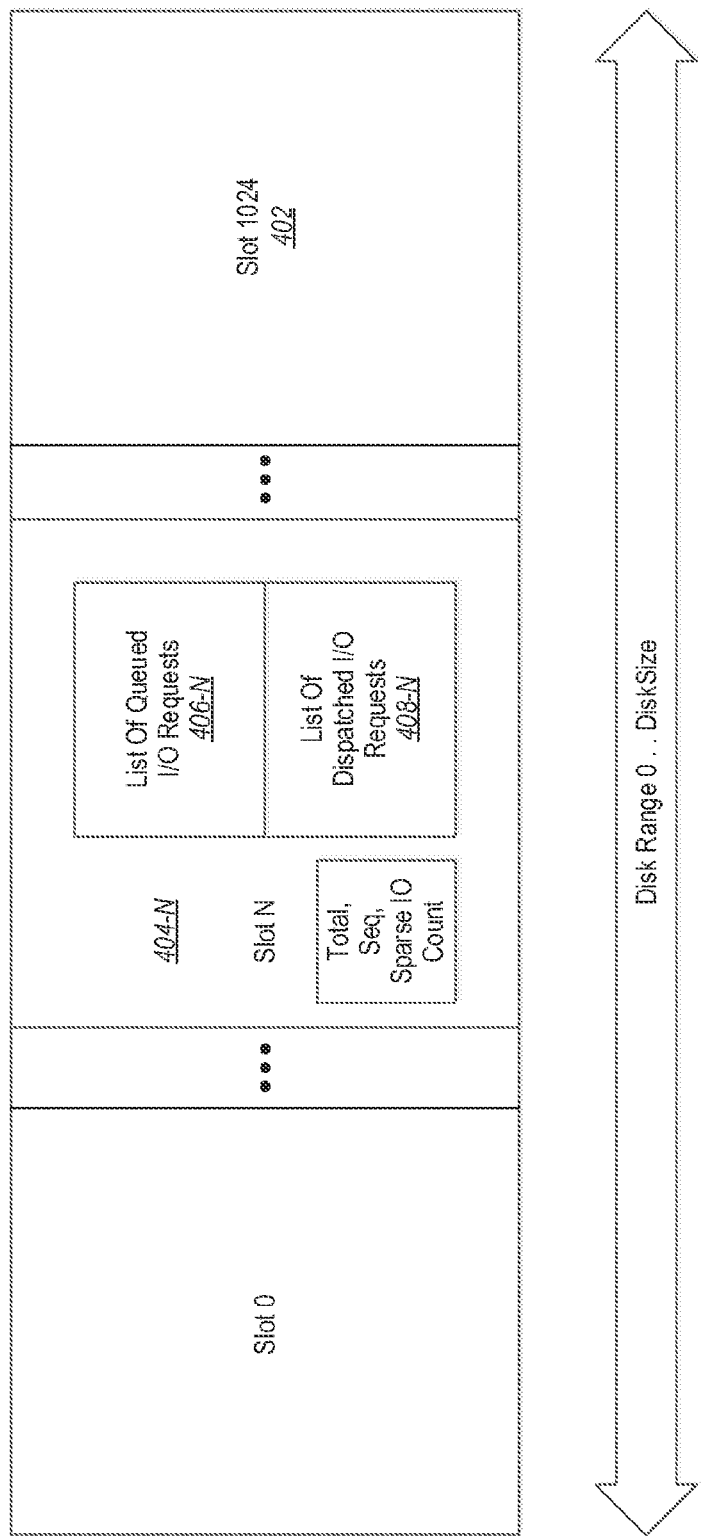
FIG. 4 illustrates a de-randomizer.

In some embodiments, a de-randomizer, as illustrated in FIG. 4, may be used to economize the cost of certain I/O operations by attempting to perform the I/O operations as sequential or sparse I/O operations, while holding other random I/O operations or other sequential streams to ensure that the storage device keeps executing sequential I/O streams and does not switch over to other I/O operations, to reduce or eliminate seek times. This is particularly applicable to rotational HDD embodiments. Embodiments can check for a "seek penalty" using a storage query property.

To improve overall disk performance, some embodiments detect sequential and sparse streams. When a sequential stream is detected embodiments send only that sequential stream to the disk and do not send other sequential streams or other random I/O operations until the sequential stream stops or some threshold is reached. For example, in some embodiments, a sequential threshold may be set to 32M. Thus, in the illustrated example, after 32M of sequential I/O operations, embodiments switch over to other random I/O operations or another sequential stream.

Referring now to FIG. 4, an example de-randomizer 402 is illustrated. In the example illustrated in FIG. 4, the de-randomizer divides each disk into 1024 slots, although other embodiments may use other divisions. When a read/write I/O is en-queued, it is en-queued to the queue of an entity that requested the I/O operation (e.g. one of queues 108-1, 108-2, 108-3, 108-*n*) and is sent to the de-randomizer, embodiments place it into an appropriate slot. The slot selected is based on I/O offset and disk size.

Each Slot will maintain a list of queued I/O operations sorted by offset and list of I/O requests already dispatched down to the storage stack. Thus, for example, FIG. 4 illustrates a queue slot 404-N. The queue slot 404-N includes a queued list 406-N and a dispatched list 408-N. The queued list 406-N includes a list of the I/O operations the need to be performed on the storage device 104 (see FIG. 1). The dispatched list 408-N includes a list of I/O operations that have been dispatched to the storage device 104.

I/O operations that are adjacent to other I/O operations in the dispatched list 408-N can be performed as sequential operations. I/O operations not adjacent to I/O operations in the dispatched list 408-N in the same slot can sometimes be performed as sparse operations. Other times, as discussed above, such operations will be treated as having half of the cost of a random I/O operation. I/O operations in different queued lists of different slots will be treated as random I/O operations.

Each slot may also maintain counters (illustrated collectively at 410-N) for the number of total, sequential and sparse I/O operations currently dispatched to the storage stack.

Every time sequential I/O operations are dispatched, embodiments will increment the sequential I/O counter. As long as there is at least one sequential I/O operation pending, and an entity for the I/O operation has sufficient budget, embodiments wait for the next sequential I/O operation to get queued and will not take non-sequential I/O operation from the same slot nor switch to another slot. If a sequential stream drains (i.e. a last dispatched sequential I/O operation completes) embodiments pick a next I/O operation from the same slot (e.g. slot 404-N) based on fairness/priority as indicated by the budgets as illustrated previously herein, to attempt to cause a sparse operation to be performed. While, as described above, embodiments attempt to obtain a next I/O operation to dispense from the same de-randomizer slot this is tempered by a timeout mechanism that keeps a given de-randomizer slot from monopolizing a storage device 104 as will be explained in more detail below.

Every time a sparse I/O is dispatched, embodiments will increment the sparse I/O counter 410. In some embodiments, as long as there are at least three (or some other selected number in other embodiments) sparse I/O operations pending embodiments wait for the next I/O operation to get queued to the same slot and will not switch to another slot. Again, while, as described above, embodiments attempt to obtain a next I/O operation to dispense from the same de-randomizer slot, this is tempered by a timeout mechanism that keeps a given de-randomizer slot from monopolizing an storage device 104 as will be explained in more detail below.

Thus, as illustrated above, to avoid the costs of random access performance embodiments will remember the last slot—i.e., the slot where the last I/O operation was dispatched from. When an I/O operation completes and room is available in a disk queue, embodiments attempt to dispatch an I/O operation from the last slot to obtain sequential performance. If an I/O operation cannot be identified next to the slot where the last I/O operation was dispatched from, then embodiments will attempt to identify an I/O operation from the same slot so as to attempt to cause a sparse operation to be performed. If an operation cannot be identified from the same slot, then an operation can be selected for any entity from any slot. As noted previously, this may be done in some embodiments based on budget sorting of the entities identified in the ready category illustrated in FIG. 2.

To maintain fairness embodiments limit the number of I/O operations that can continuously dispatch from the same slot. When the limit is reached embodiments pick a next I/O based on fairness/priority. This limit may be determined in a number of different fashions. For example, in some embodiments, embodiments may limit I/O operations from the same de-randomizer slot by time. For example, embodiments may limit I/O operations from the same slot to ¼ second, or some other appropriate selected timeout. Alternatively, embodiments may limit to a fixed threshold number of operations.

Further, limits may also be enforced based on budgets as described above. Thus, for example, even though there are additional sequential operations that could be performed for a first entity, if that first entity does not have sufficient budget credit to have the operation performed, then a different operation may be performed for a different second entity, which may result in switching to a different de-randomizer slot, resulting in a seek time cost. This will also result in a seek time cost for the operation that was not performed for the first entity due to budget constraints when it is eventually performed at same time when the budget for the first entity has been replenished. However, it will enforce fair access to the storage device 104.

Embodiments can determine if an entity has sufficient budget by first identifying an operation in a de-randomizer slot that is a lower cost operation due to being a sequential, sparse, or otherwise from the same slot as an immediately preceding operation that has been dispatched to disk. Then, based on the position of the operation in the de-randomizer slot, which is correlated to I/O offset and disk size, the appropriate queue for an entity can be identified that also includes the I/O operation. Thus, the entity is also identified. Using this information, budget credit for the entity can be ascertained to determine if the entity has sufficient budget for the I/O operation to be performed.

Figure 5:
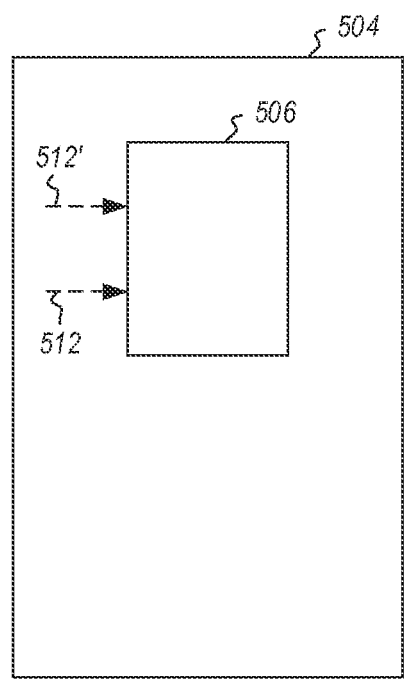
FIG. 5 illustrates a de-randomizer slot.

The de-randomizer 402 may also include functionality to can correct I/O operations that arrive to the de-randomizer 402 slightly out of order. FIG. 5 illustrates an example of a de-randomizer slot 504 and how when I/O operations come slightly out of order embodiments can reorder them. As noted above, I/O operations are added to the de-randomizer based on disk size and offset. Thus, a set of sequential I/O operations should be stored sequentially in a de-randomizer slot, such as slot 504. However, due to various factors, such as network latencies, network gateway anomalies, or for other reasons, I/O operations may arrive slightly out of order. Thus, embodiments may be dispatching a set of sequential operations to disk when an I/O operation that should have been dispatched prior to operations being dispatched arrives at the slot 504.

In the illustrated example, a pointer 512 points at the operation being dispatched to the storage device 104. An I/O operation that should have occurred previous to the I/O operation at the offset at the pointer 512 may be delivered to the slot 504 and will have a lower offset than the offset at the pointer 512. Some embodiments may include functionality for adding the I/O operation to the slot 504 and moving the pointer 512 to a lower offset to point at the recently delivered I/O operation, as illustrated by the pointer in phantom at 512' In some embodiments, to accomplish this, embodiments may sort queued I/O operations by offset in case they come out of order over a network.

State Machine Algorithm

The following now illustrates a simplified state machine algorithm that may be implemented in some embodiments:

On I/O Dispatch:
 1. Place I/O into the end of a node's queue
 2. For HDD if I/O is read or write—place I/O into de-randomizer's slot based on I/O offset, and sorted by offset in the list of queued I/O operations (e.g. 406-N)
 3. Try to dispatch next I/O to the storage On I/O Completion:
 1. Update sequential, sparse and total I/O counters
 2. Try to dispatch next I/O to the storage Try to Dispatch Next I/O to the Storage:
 1. If disk queue already full (64 I/O operations for SAS or 30 for SATA in one example embodiment) then exit
 2. If disk has no seek penalty (i.e. no de-randomizer is needed) then goto 4
 3. If current slot has sequential I/O operations—try to dispatch next sequential I/O from the same slot; If current slot has 3+ sparse I/O operations—try to dispatch next I/O from the same slot. If I/O is available—update debt for Node, Category, Priority bucket. If debt it too high continue to 4, otherwise dispatch I/O and exit state. If current slot has sequential or sparse I/O operations already dispatched, but no new I/O operations are available to dispatch, hold and do not dispatch any new I/O operations from the other slots.
 4. Pick next priority bucket, category and node based on fairness calculations, pick oldest I/O from that node. Dispatch that I/O and update current slot info to where that I/O is from.

Queue Depth

The following now illustrates optimizations that may be implemented with respect to queue depth.

Some embodiments may optimize I/O queue depth on the disk. Increasing 110 queue depth on a disk may improve I/O operations performance when I/O is random. This is because a rotational disk looks at all pending I/O operations and executes one that can be executed fast, it pick a sector that closest to the head. Increasing queue depths from 8 to 64 shows performance improvement. However increasing it from 64 to 128 does not show much difference.

On the down side large queue depth will put nodes with small number of outstanding I/O operations at a disadvantage compared to nodes with large number of outstanding I/O operations because at any point in time, the disk queue will be filled with I/O operations from a node with large number of outstanding I/O operations. When a node sends its first I/O it will take time proportional to the queue depth.

Thus, some embodiments limit queue depth on the disk to about 64 on SAS disks and about 30 on SATA, or some other appropriate queue depth that may be selected.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
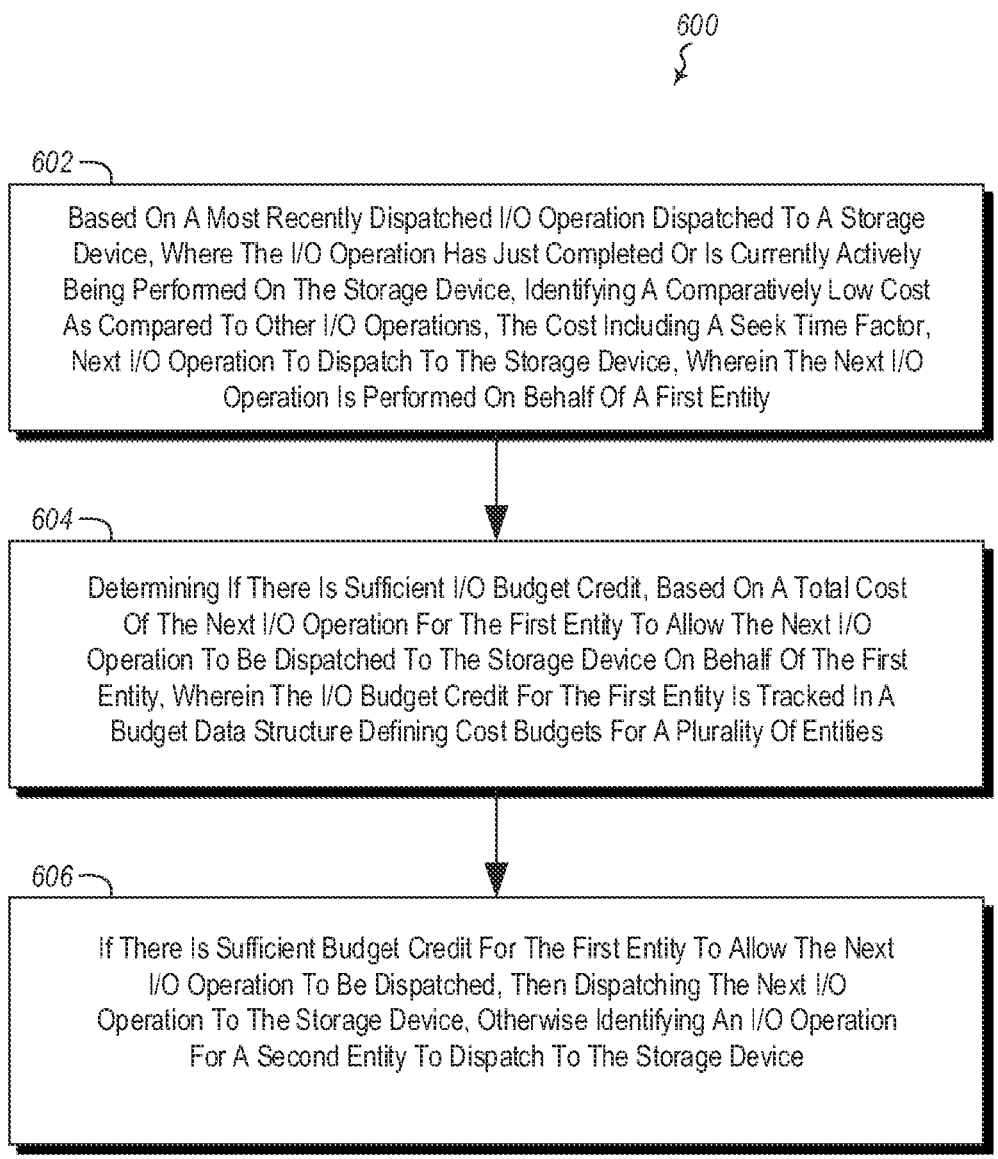
FIG. 6 illustrates a method of a method of managing outstanding I/O operations to a storage device.

Referring now to FIG. 6, a method 600 is illustrated. The method 600 may be practiced in a system comprising a plurality of entities. The method includes acts for managing outstanding I/O operations to a storage device. The method includes based on a most recently and/or currently dispatched I/O operation dispatched to a storage device, where the I/O operation has just completed or is currently actively being performed on the storage device, identifying a comparatively low cost, as compared to other I/O operations, the cost including a seek time factor, next I/O operation to dispatch to the storage device, wherein the next I/O operation is performed on behalf of a first entity (act 602).

The method 600 further includes determining if there is sufficient I/O budget credit, based on a total cost of the next I/O operation for the first entity to allow the next I/O operation to be dispatched to the storage device on behalf of the first entity, wherein the I/O budget credit for the first entity is tracked in a budget data structure defining cost budgets for a plurality of entities (act 604).

If there is sufficient budget credit for the first entity to allow the next I/O operation to be dispatched, the method further includes then dispatching the next I/O operation to the storage device, otherwise identifying an I/O operation for a second entity to dispatch to the storage device (act 606).

The method 600 may be practiced where identifying an I/O operation for a second entity to dispatch to the storage device includes identifying the second entity based on an amount of budget credit in the second entity's I/O budget as compared to amounts of budget credit in one or more other entities I/O budgets. For example, the second entity may have a budget credit amount in its I/O budget that exceeds a threshold. For example, as illustrated above, the budget amount may be in the top half of I/O budgets in the ready category illustrated in FIG. 2.

The 600 may be performed where identifying an I/O operation for a second entity to dispatch to the storage device includes identifying the second entity from a ready data structure that is included in a set of entity selection control data structures. The set of data structures may include a throttle data structure that includes entities having no I/O operations, one or more pending I/O operations, and a threshold amount of I/O budget credit. The set of data structures may further include an empty data structure that includes entities having no I/O operations and a threshold amount of I/O budget credit. The set of data structures may further include the ready data structure that includes entities having I/O operations and a threshold amount of I/O budget credit. The set of data structures may further include a jail data structure that includes entities not having a threshold amount of I/O budget credit.

Embodiments of the method 600 may further include replenishing budget credit to one or more entities based on a determination that all entities have been fairly granted an opportunity to access the storage device. This may be done, for example, by determining that one or more entities are present in the jail data structure, that no entities are present in the ready data structure and that no entities are present in the throttle data structure.

Embodiments of the method 600 may further include replenishing budget credit to one or more entities, but limiting the amount of credit refilled to entities. Thus for example, embodiments may limit the amount of credit refilled to entities in the empty and/or jail categories based on a predetermined maximum budget credit threshold for entities. This is illustrated in more detail above Embodiments of the method 600 may further include replenishing budget credit to one or more entities based on a determination that all entities have been fairly granted an opportunity to access the storage device.

Embodiments of the method 600 may be practiced where identifying an I/O operation for a second entity to dispatch to the storage device comprises identifying an I/O operation by age. For example, the oldest I/O waiting to be performed may be selected.

Embodiments of the method 600 may further include at a later time performing the next I/O operation as a result of determining that there was not sufficient I/O budget credit. This later performed operation to perform the next I/O has a different cost value when performed at the later time due to intervening I/O operations increasing the seek time cost for the next I/O. Thus, the I/O would become a random I/O as opposed to a sequential I/O.

The method 600 may be performed where the entities are defined by priority, category, (such application or system categories) and node.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FP- GAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for managing outstanding I/O operations for a plurality of entities to a hardware storage device, the system comprising:

a de-randomizer, operating on one or more processors of the computing system, wherein the de-randomizer comprises a plurality of slots for a hardware storage device, each slot comprising a queued list for listing I/O operations to be dispatched to the hardware storage device, wherein the slots are organized based on the hardware storage device size and offsets into the hardware storage device such that operations adjacent to each other in a queued list in the same slot are treated as sequential I/O operations to the hardware storage device to determine I/O cost, and non-adjacent operations within the same slot are treated as sparse I/O operations to the hardware storage device to determine I/O cost, and I/O operations from different queued lists in different slots are treated as random I/O operations to the hardware storage device to determine operation cost;

a plurality of entity queues coupled to the de-randomizer, the entity queues being configured to queue I/O operations for the plurality of entities to the hardware storage device;

a budget data structure coupled to the de-randomizer, wherein the budget data structure is configured to track budgets credits for the plurality of entities to determine which of the plurality of entities have sufficient budget to be allowed to have I/O operations dispatched to the hardware storage device;

wherein, based on either a most recent or current I/O operation dispatched to a hardware storage device, the computing system is configured to use the de-randomizer and budget data structure to identify sequential and sparse operations for a first entity of the plurality of entities to dispatch to the hardware storage device when the first entity has sufficient budget to have the I/O operation performed on its behalf, wherein when selecting the next operation for a first entity, the relative cost of the next operation is determined, including a comparison to other I/O operations and a cost for seek time, and the de-randomizer prioritizes selecting a sequential I/O operation in a given slot over a sparse I/O operation in the given slot;

wherein, based on determining that (i) the first entity has sufficient budget to have an I/O operation performed on its behalf, and that (ii) there are no remaining queued sequential operations in the given slot, the computer system is configured to use the de-randomizer to select a next sparse operation and to dispatch the next sparse operation to the hardware storage device; and wherein, based on determining that the first entity lacks sufficient budget to have an additional I/O operation performed on its behalf, the computing system is configured to use the de-randomizer to identify an I/O operation for a second entity of the plurality of entities to dispatch to the hardware storage device.

2. The computing system of claim 1, wherein the computing system is configured to identify the I/O operation for the second entity of the plurality of entities to dispatch to the hardware storage device by identifying the second entity based on an amount of budget credit in the second entity's I/O budget as compared to amounts of budget credit in one or more other entities of the plurality of entities I/O budgets.

3. The computing system of claim 2, wherein the computing system is configured to identify the I/O operation for the second entity to dispatch to the hardware storage device by identifying that the second entity has a budget credit amount in its I/O budget that exceeds a threshold.

4. The computing system of claim 1, wherein the budget data structure comprises:

a throttle data structure that includes entities of the plurality of entities having no I/O operations, one or more pending I/O operations, and a threshold amount of I/O budget credit;

an empty data structure that includes entities of the plurality of entities having no I/O operations and a threshold amount of I/O budget credit;

the ready data structure that includes entities of the plurality of entities having I/O operations and a threshold amount of I/O budget credit; and a jail data structure that includes entities of the plurality of entities not having a threshold amount of I/O budget credit; and wherein identifying the I/O operation for a second entity of the plurality of entities to dispatch to the hardware storage device comprises identifying the particular entity from the ready data structure.

5. The computing system of claim 1, wherein identifying the I/O operation for the second entity of the plurality of entities to dispatch to the hardware storage device comprises identifying an I/O operation by age to identify an I/O operation that is comparatively older than other I/O operations.

6. The computing system of claim 1, wherein the plurality of entities are defined by priority, category, and node.

7. In a computing system comprising one or more processors and a plurality of entities, a method of managing outstanding I/O operations to a hardware storage device, the method comprising:

operating a de-randomizer that comprises a plurality of slots for a hardware storage device, each slot comprising a queued list for listing I/O operations to be dispatched to the hardware storage device, wherein the slots are organized based on the hardware storage device size and offsets into the hardware storage device such that operations adjacent to each other in a queued list in the same slot are treated as sequential I/O operations to the hardware storage device to determine I/O cost, and non-adjacent operations within the same slot are treated as sparse I/O operations to the hardware storage device to determine I/O cost, and I/O operations from different queued lists in different slots are treated as random I/O operations to the hardware storage device to determine operation cost;

queueing, at a plurality of entity queues coupled to the de-randomizer, I/O operations for the plurality of entities to the hardware storage device;

tracking, at a budget data structure coupled to the de-randomizer, budgets credits for the plurality of entities to determine which of the plurality of entities have sufficient budget to be allowed to have I/O operations dispatched to the hardware storage device;

wherein, based on either a most recent or current I/O operation dispatched to a hardware storage device, using the de-randomizer and budget data structure to identify sequential and sparse operations for a first entity of the plurality of entities to dispatch to the hardware storage device when the first entity has sufficient budget to have the I/O operation performed on its behalf, wherein when selecting the next operation for a first entity, the relative cost of the next operation is determined, including a comparison to other I/O operations and a cost for seek time, and the de-randomizer prioritizes selecting a sequential I/O operation in a given slot over a sparse I/O operation in the given slot;

wherein, based on determining that (i) the first entity has sufficient budget to have an I/O operation performed on its behalf, and that (ii) there are no remaining queued sequential operations in the given slot, using the de-randomizer to select a next sparse operation and to dispatch the next sparse operation to the hardware storage device; and wherein, based on determining that the first entity lacks sufficient budget to have an additional I/O operation performed on its behalf, using the de-randomizer to identify an I/O operation for a second entity of the plurality of entities to dispatch to the hardware storage device.

8. The method of claim 7, wherein identifying the I/O operation for the second entity of the plurality of entities to dispatch to the hardware storage device comprises identifying the second entity based on an amount of budget credit in the second entity's I/O budget as compared to amounts of budget credit in one or more other entities of the plurality of entities I/O budgets.

9. The method of claim 8, wherein the second entity has a budget credit amount in its I/O budget that exceeds a threshold.

10. The method of claim 7, wherein identifying at the one or more processors the I/O operation for the second entity to dispatch to the hardware storage device comprises identifying the second entity from a ready data structure that is included in a set of data structures including:
 a throttle data structure operating at the one or more processors that includes entities of the plurality of entities having no I/O operations, one or more pending I/O operations, and a threshold amount of I/O budget credit;
 an empty data structure operating at the one or more processors that includes entities of the plurality of entities having no I/O operations and a threshold amount of I/O budget credit;
 the ready data structure operating at the one or more processors that includes entities of the plurality of entities having I/O operations and a threshold amount of I/O budget credit; and
 a jail data structure operating at the one or more processors that includes entities of the plurality of entities not having a threshold amount of I/O budget credit.

11. The method of claim 10, further comprising replenishing budget credit to one or more entities of the plurality of entities based on a determination that all entities of the plurality of entities have been fairly granted an opportunity to access the hardware storage device by determining that the one or more entities are present in the jail data structure, that no entities are present in the ready data structure and that no entities are present in the throttle data structure.

12. The method of claim 10, further comprising replenishing budget credit to the one or more entities, but limiting the amount of credit refilled to entities based on a predetermined maximum budget credit threshold for entities.

13. The method of claim 7, further comprising replenishing budget credit to one or more entities of the plurality of entities based on a determination that all entities have been fairly granted an opportunity to access the hardware storage device.

14. The method of claim 7, wherein identifying at the one or more processors the I/O operation for the second entity to dispatch to the hardware storage device comprises identifying an I/O operation by age.

15. The method of claim 7, further comprising at a later time performing the next I/O operation as a result of determining that there was not sufficient I/O budget credit, and wherein the next I/O has a different cost value when performed at the later time due to intervening I/O operations increasing the seek time cost for the next I/O.

16. The method of claim 7, wherein the plurality of entities are defined by priority, category, and node.

17. The method of claim 7, wherein the seek time factor includes a gap cost.

18. A hardware storage device comprising computer executable instructions that when executed by one or more processors cause the following method to be performed:
 operating a de-randomizer that comprises a plurality of slots for a hardware storage device, each slot comprising a queued list for listing I/O operations to be dispatched to the hardware storage device, wherein the slots are organized based on the hardware storage device size and offsets into the hardware storage device such that operations adjacent to each other in a queued list in the same slot are treated as sequential I/O operations to the hardware storage device to determine I/O cost, and non-adjacent operations within the same slot are treated as sparse I/O operations to the hardware storage device to determine I/O cost, and I/O operations from different queued lists in different slots are treated as random I/O operations to the hardware storage device to determine operation cost;
 queueing, at a plurality of entity queues coupled to the de-randomizer, I/O operations for the plurality of entities to the hardware storage device;
 tracking, at a budget data structure coupled to the de-randomizer, budgets credits for the plurality of entities to determine which of the plurality of entities have sufficient budget to be allowed to have I/O operations dispatched to the hardware storage device;
 wherein, based on either a most recent or current I/O operation dispatched to a hardware storage device, using the de-randomizer and budget data structure to identify sequential and sparse operations for a first entity of the plurality of entities to dispatch to the hardware storage device when the first entity has sufficient budget to have the I/O operation performed on its behalf, wherein when selecting the next operation for a first entity, the relative cost of the next operation is determined, including a comparison to other I/O operations and a cost for seek time, and the de-randomizer prioritizes selecting a sequential I/O operation in a given slot over a sparse I/O operation in the given slot;
 wherein, based on determining that (i) the first entity has sufficient budget to have an I/O operation performed on its behalf, and that (ii) there are no remaining queued sequential operations in the given slot, using the de-randomizer to select a next sparse operation and to dispatch the next sparse operation to the hardware storage device; and wherein, based on determining that the first entity lacks sufficient budget to have an additional I/O operation performed on its behalf, using the de-randomizer to identify an I/O operation for a second entity of the plurality of entities to dispatch to the hardware storage device.

19. The hardware storage device of claim 18, wherein identifying the I/O operation for the second entity to dispatch to the hardware storage device comprises identifying the second entity based on an amount of budget credit in the second entity's I/O budget as compared to amounts of budget credit in one or more other entities I/O budgets.

20. The hardware storage device of claim 18, the method further comprising at a later time performing the next I/O operation as a result of determining that there was not sufficient I/O budget credit, and wherein the next I/O has a different cost value when performed at the later time due to intervening I/O operations increasing the seek time cost for the next I/O.

* * * * *